| United States Patent [19] | [11] Patent Number: 4,812,545 |
| Renzi et al. | [45] Date of Patent: * Mar. 14, 1989 |

[54] PROCESS FOR THE PREPARATION OF SUBSTITUTES FOR OPTICAL GLASSES AND POLYMERIZABLE LIQUID COMPOSITION SUITABLE TO THAT PURPOSE

[75] Inventors: Fiorenzo Renzi, Gorgonzola; Franco Rivetti, Schio; Ugo Romano, Vimercate; Claudio Gagliardi, San Donato Milanese, all of Italy

[73] Assignee: Enichem Sintesi S.p.A., Palermo, Italy

[ * ] Notice: The portion of the term of this patent subsequent to Jun. 4, 2002 has been disclaimed.

[21] Appl. No.: 863,526

[22] Filed: May 15, 1986

[30] Foreign Application Priority Data

May 15, 1985 [IT]   Italy ................. 20718 A/85

[51] Int. Cl.$^4$ ................. C08F 26/06; C08F 18/24
[52] U.S. Cl. ................. 526/230.5; 526/232; 526/232.1; 526/261; 526/314; 264/1.1; 264/2.2
[58] Field of Search ............. 526/261, 314, 230.5, 526/232, 232.1

[56] References Cited

U.S. PATENT DOCUMENTS

| 4,508,656 | 4/1985 | Romano | 526/314 |
| 4,521,577 | 6/1985 | Romano | 526/261 |
| 4,607,087 | 8/1986 | Moriya | 526/314 |
| 4,622,376 | 11/1986 | Misura | 526/314 |
| 4,623,705 | 11/1986 | Romano | 526/314 |

FOREIGN PATENT DOCUMENTS 0035304  2/1984  European Pat. Off. .

*Primary Examiner*—C. Warren Ivy
*Attorney, Agent, or Firm*—Birch, Stewart, Kolasch & Birch

[57] ABSTRACT

Substitutes for optical glasses are obtained by submitting to polymerization, in the presence of a free-radical initiator and in bulk, a polymerizable liquid composition containing:

a monomer of diethyleneglycol bis(allylcarbonate);
oligomers of diethyleneglycol bis(alllycarbonate);
a monomer of tris(hydroxyethyl)isocyanurate tris(allylcarbonate); and
at least one free-radical initiator.

23 Claims, No Drawings

PROCESS FOR THE PREPARATION OF SUBSTITUTES FOR OPTICAL GLASSES AND POLYMERIZABLE LIQUID COMPOSITION SUITABLE TO THAT PURPOSE

The present invention relates to a polymerizable liquid composition based on allylcarbonates, and to the conversion of this composition into substitutes for optical glasses, having improved optical and mechanical characteristics. The invention relates also to the substitutes for optical glasses thus obtained.

In the field of the substitutes for optical glasses, the products of polymerization of glycols bis(allylcarbonates) are interesting, such as, e.g., those disclosed in European Patent Appln. Publ. No. 35,304, and among these, the products from diethyleneglycol bis(allylcarbonate) polymerization are considerably interesting from the industrial viewpoint in view of the optical and mechanical characteristics of such polymerizates. In particular, according to the prior art, mixtures of diethyleneglycol bis(allylcarbonate) and of a free-radical polymerization initiator are polymerized in glass moulds, having a shape corresponding to the shape of the article which is to be manufactured, by the casting technique. Such articles as flat sheets, ophthalmic lenses and safety lenses are thus produced.

However, the use of diethyleneglycol bis(allylcarbonate) shows some limitations in the application field of the replacement of optical glasses. For example, it is not much suitable to the production of high-diopter lenses and of lenses having sharp curvature changes, such as Fresnel's lenses and lenticular lenses, and this is because of its high shrinkage. Such a shrinkage causes the occurrence of stress phenomena which cause the separation from the mould, and sometimes breakage phenomena.

In particular applications of high commercial interest, for example in the production of protecting shields, solar panels, lenses for hunters, and so forth, substitutes for optical glasses having impact strength higher than that made possible by the polymerizates of diethyleneglycol bis(allylcarbonate) are required.

Thus, in U.S. Pat. No. 4,521,577 granted June 6, 1985 a polymerizable liquid composition is disclosed, which is constituted by an oligomer of a bis(allylcarbonate) of a dihydroxy alcohol and by a monomer of a bis(allylcarbonate) of a dihydroxy alcohol or of a tris(allylcarbonate) of a trihydroxyalcohol and/or of an acrylic or vinyl monomer. These compositions give rise to polymerizates suitable for use as substitutes for optical glasses, satisfactory both as regards the shrinkage phenomena during the polymerization step, and the physical and mechanical characteristics of the same polymerizates.

However, these liquid compositions often have viscosity values higher than about 300 centistokes at 25° C. and such a characteristic thereof can create difficulties in their conversion into manufactured articles, during their processing by the casting technique.

Hence it is desirable to have available compositions of liquid allylcarbonates sufficiently fluid under room conditions to overcome the processing difficulties previously mentioned and polymerizable, under the usual polymerization conditions, with low shrinkage, in the production of substitutes for optical glasses having improved characteristics, in particular as regards the impact resistance.

It has been found now that such a requirement can be fulfilled when the substitutes for the optical glasses are prepared by the casting technique, by starting from a polymerizable liquid allylcarbonate composition containing:

(A) from 10 to 50% by weight of a monomer of diethyleneglycol bis(allylcarbonate);
(B) from 20 to 70% by weight of oligomers of diethyleneglycol bis(allylcarbonate);
(C) from 5 to 50% by weight of a monomer of tris(hydroxyethyl)isocyanurate tris(allylcarbonate), the composition containing furthermore at least one free-radical initiator in an amount of from 1 to 6% by weight, relative to the total of the (A), (B) and (C) components.

The component (A) of the polymerizable liquid composition is a monomer of diethyleneglycol bis(allylcarbonate), defined by the formula:

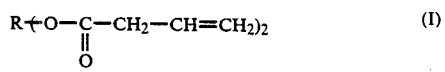

wherein R is the diethyleneglycol radical.

This component can be prepared by the reaction between diallylcarbonate and diethyleneglycol in a molar ratio to each other higher than about 10:1, in the presence of a basic catalyst, for example according to the disclosure in European Pat. Appln. publ. No. 35,304.

Under these conditions, the reaction product constitutes by at least about 80–90% by weight of compound (I), the residual percentage being constituted by oligomers of diethyleneglycol bis(allylcarbonate). Thus, the component (A) of the polymerizable liquid composition may constitute compound (I) only, or a mixture containing at least about 80–90% by weight of compound (I), the residual percentage being constituting its oligomers.

In the preferred form of embodiment the component (A) is present in the polymerizable liquid composition in an amount of from 15 to 45% by weight.

The component (B) of the polymerizable liquid composition is an oligomer or a mixture of oligomers of diethyleneglycol bis(allylcarbonate), defined by the formula:

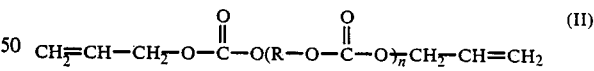

wherein R is the diethyleneglycol radical and n has a value, or an average value, of from 2 to 5.

This component can be prepared by the reaction between diallylcarbonate and diethyleneglycol in a molar ratio to each other of the order of about 2:1, in the presence of a basic catalyst, in a manner similar preceding component (A).

Under these conditions, an essentially oligomeric reaction product corresponding to the above formula (II) is obtained, with an n average value of 3 and constituting at least about 60–70% by weight by oligomers, the residual percentage constituting a monomer of diethyleneglycol bis(allylcarbonate).

In the preferred form of embodiment, the component (B) is present in the polymerizable liquid composition in an amount of from 30 to 60% by weight.

The component (C) of the polymerizable liquid composition is a monomer of tris(hydroxyethyl)isocyanurate tris(allylcarbonate), defined by the formula:

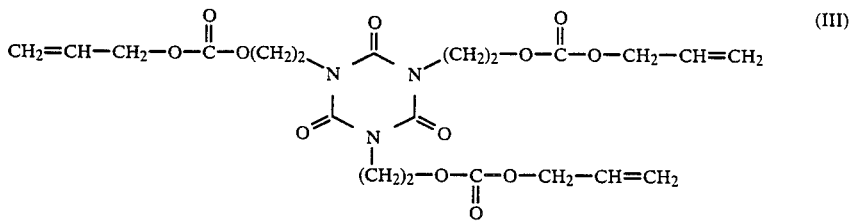

This component can be prepared by the reaction between diallylcarbonate and tris(hydroxyethyl)isocyanurate in molar ratio to each other greater than about 10:1, operating in the presence of a basic catalyst, in a manner similar to component (A). Under these conditions, a reaction product constituting at least about 60–70% by weight of compound (III) is obtained, the residual percentage being constituted by oligomers of tris(hydroxyethyl)isocyanurate tris(allylcarbonate).

Thus, the component (C) of the polymerizable liquid composition may constitute compound (III) only, or a mixture containing at least about 60–70% by weight of compound (III), the residual percentage being constituted by its oligomers.

In the preferred form of embodiment the component (C) is present in the polymerizable liquid composition in an amount of from 10 to 45% by weight.

The polymerizable liquid composition of the present invention contains moreover one or more polymerization initiators, soluble in the same composition, and able to generate free radicals within a temperature range of from about 30° to about 120° C.

Non limiting Examples of such initiators are diisopropylperoxydicarbonate, dicyclohexylperoxydicarbonate, disec.butylperoxydicarbonate, dibenzoylperoxide and tert-butylperbenzoate. In the preferred form of embodiment, the polymerization initiator is present in an amount of from 3 to 5,5% by weight, relative to the total of the weights of components (A), (B) and (C).

The polymerizable liquid composition on the present invention can additionally contain one or more conventional additives, such as stabilizers, release agents, dyes, pigments, U.V. absorbers or I.R. absorbers and the like, however in an overall amount not greater than 1% by weight relative to the total of the weights of components (A), (B) and (C).

The polymerizable liquid composition of the present invention has viscosity values generally lower than 250 centistokes (25° C.) and typically comprised within the range of from 50 to 200 centistokes (25° C.). These viscosity values render the same composition particularly suitable to the processing by the casting technique, according to which the composition is poured into moulds of shape corresponding to the shape of the article which is to be manufactured, operating at a temperature lower than the decomposition temperature of the free-radical initiator, and the composition is then polymerized inside the mould.

In particular, the polymerization is carried out by heating the polymerizable liquid composition at a temperature of from 30° to 120° C. The corresponding plymerization times vary within a range from about 3 to about 100 hours. In this polymerization, the volume shrinkage phenomena are very limited, the shrinkage being in any case lower than about 10% by volume.

Thus, stress phenomena, which cause the separation of the polymerizate from the mould and the breakage of the same polymerizate are avoided.

Furthermore, such polymerizates have a set of such optical and mechanical characteristics as to make them particularly useful as substitutes for optical glasses.

Among the mechanical characteristics, the impact strength, which is in any case higher than 12 kg/cm$^2$, is particularly good.

In the following experimental Examples, reported with an exempletive and not a limitative purpose, the following components have been used for the polymerizable liquid composition.

(A) monomer of diethyleneglycol bis(allylcarbonate): product of the reaction between diallylcarbonate and diethyleneglycol in molar ratio to each other of about 12:1, by operating as disclosed in European Pat. Appln. publ. No. 35,304.

This product contains about 85–90% by weight of diethyleneglycol bis(allylcarbonate) (I), the residual percentage being constituted by oligomers of the same;

(B) oligomers of diethyleneglycol bis(allylcarbonate): product of the reaction between diallylcarbonate and diethyleneglycol in molar ratio to each other of about 2:1, operating as disclosed in the above mentioned European Pat. Appln.

This product corresponds to the above formula (II) with n average value of about 3, the monomer content being of the order of 35% by weight.

(C) monomer of tris(hydroxyethyl)isocyanurate tris(allylcarbonate): product of the reaction between diallylcarbonate and tris(hydroxyethyl)isocyanurate in molar ratio to each other of 12:1, operating as disclosed in the above mentioned European Pat. Appln.

This product contains about 75% by weight of tris(hydroxyethyl)isocyanurate tris(allylcarbonate) (III), the residual percentage being constituted by oligomers of the same.

The components (A), (B) and (C) are mixed with each other in the proportions which are indicated hereunder, and to the mixture dicyclohexylperoxydicarbonate (DCPD) is then added in a constant amount of 5.2% by weight relatively to the total of the weights of (A), (B) and (C).

The compositions thus obtained are poured, at room temperature (20°–25° C.), into moulds constituted by two glass sheets of dimensions of 20×20 cm, provided with a gasket of plastified polyvinylchloride of 3.2 mm in thickness.

The polymerization is carried out in oven with forced air circulation, at the temperature of 48° C. for 72 hours. At the end the sheets are removed from the moulds and are maintained at 110° C. during the following two hours, with the purpose of destroying the possibly unreacted catalyst and releasing the stresses frozen during the polymerization step.

The technological characteristics of the polymerizates thus obtained are reported in the following Tables.

In particular, the following characteristics have been determined:

(a) Optical characteristics
  refractive index ($n_D^{20}$) by Abbe refractometer (ASTM D-542);
  % Haze and % transmittance in the visible band: measured by using Hazegard XL-211 marketed by Gardner Co. (ASTM D-1003);
  Yellow Index (YI), defined as:

$$YI = \frac{100}{Y}(1,277\,X - 1.06\,Z)$$

as measured by the Gardner XL-805 Colorimeter (ASTM D-1925).

(b) Physical and mechanical characteristics
  Density, as determined by hydrostatic balance at the temperature of 20° C. (ASTM D-792);
  Volume shrinkage on polymerization, calculated by the following equation:

$$\% \text{ Shrinkage} = \frac{(\text{polymer density} - \text{monomer density})}{\text{polymer density}} \times 100$$

Rockwell Hardness (M), as measured by Rockwell Durometer (ASTM D-785);
  Ultimate tensile strength and flexural elastic modulus (ASTM D-790);
  Abrasion strength, Taber method (ASTM D-1044 modified), carried out by using a pair of cs-10F grinding wheels and with a load of 500 g on both of them. The results are expressed as the ratio between the number of passages necessary to produce a 10% increase in Haze for the sample under test, and for a reference sample of poly(-methylmetacrylate) (PMMA).
  IZOD Impact strength without notch (ASTM D-256 modified).

(c) Thermal characteristics
  High-load Deflection Temperature (HDT) (°C./1.8 2 MPa), (ASTM D-648).

EXAMPLE 1

A polymerizable liquid composition according to the invention (Test 1) and two comparative polymerizable liquid compositions (Tests 2 and 3) are prepared. These compositions are reported in Table 1, together with their viscosity and density values.

TABLE 1

| Composition | Test 1 | Test 2 | Test 3 |
|---|---|---|---|
| Component (A) (parts by weight) | 35 | 95 | — |
| Component (B) (parts by weight) | 35 | — | 66 |
| Component (C) (parts by weight) | 25 | — | 30 |
| Catalyst (DCPD; parts by weight) | 5 | 5 | 4 |
| Viscosity (centistokes at 25° C.) | 81 | 14 | 450 |
| Density (g/cc; 20° C.) | 1.209 | 1.1525 | 1.247 |

These compositions are polymerized and in Table 3 the characteristics are reported of the thus obtained polymers.

EXAMPLE 2

Polymerizable liquid compositions are prepared according to the invention (Tests from 4 to 12) and in Table 2 the same compositions are reported, together with their viscosity and density values.

These compositions are polymerized and in Table 4 the characteristics of the polymers thus obtained are reported.

TABLE 2

| Composition | Test 4 | Test 5 | Test 6 | Test 7 | Test 8 | Test 9 | Test 10 | Test 11 | Test 12 |
|---|---|---|---|---|---|---|---|---|---|
| Component (A) (parts by weight) | 40 | 30 | 25 | 20 | 30 | 35 | 25 | 15 | 30 |
| Component (B) (parts by weight) | 45 | 45 | 50 | 55 | 40 | 30 | 40 | 50 | 30 |
| Component (C) (parts by weight) | 10 | 20 | 20 | 20 | 25 | 30 | 30 | 30 | 35 |
| Catalyst (DCPD) (parts by weight) | 5 | 5 | 5 | 5 | 5 | 5 | 5 | 5 | 5 |
| Viscosity (centistokes; 25° C.) | 52 | 100 | 116 | 127 | 122 | 131 | 163 | 214 | 184 |
| Density | 1.193 | 1.211 | 1.216 | 1.218 | 1.220 | 1.221 | 1.226 | 1.231 | 1.234 |

TABLE 3

| Composition | Test 1 | Test 2 | Test 3 |
|---|---|---|---|
| Density (g/cm³) | 1.337 | 1.311 | 1.352 |
| Volume Shrinkage (%) | 9.6 | 12.1 | 7.8 |
| $n_D^{20}$ | 1.5036 | 1.5004 | — |
| YI | 1.2 | 0.8 | 1.2 |
| Haze (%) | 0.15 | 0.1 | 0.5 |
| Transmittance in visible band (%) | 93.1 | 93.3 | 93 |
| Rockwell Hardness (M) | 99 | 97 | 99 |
| Flexural Modulus (MPa) | 2800 | 2300 | 2500 |
| Flexural ultimate tensile strength (MPa) | 100 | 78 | 90 |
| Izod Impact Resistance modified (KJ/m²) | 12.8 | 8 | 14.3 |
| Taber Abrasion Strength (xPMMA) | 16 | 17 | 15 |
| HDT (°C.) | 70 | 66.3 | 57 |

TABLE 4

| Composition | Test 4 | Test 5 | Test 6 | Test 7 | Test 8 | Test 9 | Test 10 | Test 11 | Test 12 |
|---|---|---|---|---|---|---|---|---|---|
| Density (g/cm³) | 1.3278 | 1.3383 | 1.3398 | 1.3411 | 1.3451 | 1.3460 | 1.3480 | 1.3482 | 1.3520 |
| Volume shrinkage (%) | 10.2 | 9.5 | 9.3 | 9.2 | 9.3 | 9.3 | 9.0 | 8.7 | 8.8 |
| $n_D^{20}$ | 1.5006 | 1.5030 | 1.5034 | 1.5021 | 1.5055 | 1.5050 | 1.5045 | 1.5045 | 1.5068 |
| YI | 0.80 | 0.96 | 0.92 | 0.90 | 1.20 | 1.55 | 1.32 | 1.20 | 1.77 |
| Haze (%) | 0.21 | 0.16 | 0.19 | 0.18 | 0.07 | 0.25 | 0.22 | 0.21 | 0.51 |
| Transmittance in visib. band (%) | 93.1 | 93 | 93.1 | 93.2 | 92.8 | 92.9 | 92.9 | 92.9 | 92.7 |

TABLE 4-continued

| Composition | Test 4 | Test 5 | Test 6 | Test 7 | Test 8 | Test 9 | Test 10 | Test 11 | Test 12 |
|---|---|---|---|---|---|---|---|---|---|
| Flexural Modulus (MPa) | 2300 | 2550 | 2500 | 2450 | 2700 | 2900 | 2850 | 2700 | 3000 |
| Flexural Ultimate Strength (MPa) | 78.8 | 91 | 88.3 | 85.9 | 98.7 | 106 | 104 | 98.8 | 100.6 |
| Izod Impact Strength, modified (KJ/m$^2$) | 15.5 | 15.8 | 17.3 | 18.3 | 14.2 | 13.0 | 13.8 | 19.5 | 13.1 |
| Taber Abrasion Strength (xPMMA) | — | 16 | — | 17 | 19 | — | 19 | — | — |
| HDT (°C.) | 55 | 60.5 | 58.5 | 56.6 | 67.7 | 74.2 | 67.9 | 62.9 | 78.5 |

We claim:

1. A polymerizable liquid composition of allylcarbonates, suitable for the preparation of substitutes for optical glasses, comprising the following components:
   from 10 to 50% by weight of component (A) which is a monomer product of a reaction between diallylcarbonate and diethyleneglycol in a molar ratio of about 12:1;
   from 20 to 70% by weight of component (B) which is an oligomer product of a reaction between diallylcarbonate and diethyleneglycol in a molar ratio of about 2:1, said oligomer product being defined by the following formula:

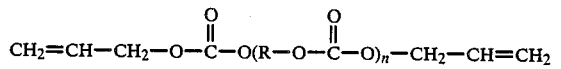

wherein R is the radical or diethylene glycol and n has a value, or an average value, of from 2 to 5;
   from 5 to 50% by weight of component (C) which is a monomer product of tris(hydroxyethyl)isocyanurate tris(allylcarbonate) resulting from a reaction of diallylcarbonate with tris(hydroxyethyl)isocyanurate in a molar ratio of higher than 10:1; and
   a free-radical initiator in an amount of from 1 to 6% by weight relative to the total weight of said (A), (B), and (C) components.

2. The composition according to claim 1, wherein component (A) contains at least about 80 to 90% by weight of a monomer of diethyleneglycol bis(allylcarbonate), the residual percentage constituting oligomers of diethyleneglycol bis(allylcarbonate).

3. The composition according to claim 1, wherein component (B) is defined by the following formula:

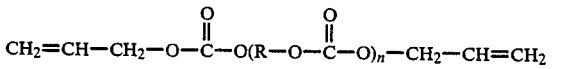

wherein R is the radical of diethylene glycol and n has an average value of about 3.

4. The composition according to claim 1, wherein component (C) is a monomer product of a reaction of diallylcarbonate with tris(hydroxyethyl)isocyanurate in a molar ratio of about 12:1, said component (C) containing about 60 to 70% by weight of a monomer of tris(hydroxyethyl)isocyanurate tris(allylcarbonate), the residual percentage constituting oligomers of tris(hydroxyethyl)isocyanurate tris(allylcarbonate).

5. The composition according to claim 1, wherein said composition comprises from 15 to 45% by weight of component (A), from 30 to 60% by weight of component (B) and from 10 to 45% by weight of component (C).

6. The composition according to claim 1, wherein said free-radial initiator is selected from a member of the group consisting of diisopropylperoxydicarbonate, dicyclohexylperoxydicarbonate, disec.butylperoxydicarbonate, dibenzoylperoxide and tert-butylperbenzoate.

7. The composition according to claim 1, wherein said composition contains said free-radical initiator in an amount of from 3 to 5.5% by weight relative to the total weight of components (A), (B) and (C).

8. The composition according to claim 1, wherein said composition additionally comprises one or more stabilizers, release agents, dyes, pigments, U.V.-radiation absorbers and I.R.-radiation absorbers, in an overall amount not greater than 1% relative to the total weight of components (A), (B) and (C).

9. A process for the preparation of substitutes for optical glasses comprising:
   combining the following components into a polymerizable composition,
      from 10 to 50% by weight of component (A) which is a monomer product of a reaction between diallylcarbonate and diethyleneglycol in a molar ratio of about 12:1;
      from 20 to 70% by weight of component (B) which is an oligomer product of a reaction between diallylcarbonate and diethyleneglycol in a molar ratio of about 2:1, said oligomer product being defined by the following formula:

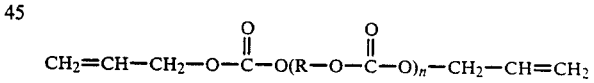

wherein R is the radical of diethylene glycol and n has a value, or an average value, of from 2 to 5;
      from 5 to 50% by weight of component (c) which is a monomer product of tris(hydroxyethyl)isocyanurate tris(allylcarbonate) resulting from a reaction of diallylcarbonate with tris(hydroxyethyl)isocyanurate in a molar ratio of higher than about 10:1; and
      a free-radical initiator in an amount of from 1 to 6% by weight relative to the total weight of said (A), (B), and (C) components;
   pouring said polymerizable composition into moulds shaped corresponding to an article which is to be manufactured;
   maintaining said polymerizable composition at a temperature lower than the decomposition temperature of said free-radical initiator; and
   polymerizing said polymerizable composition at a temperature of from 30° to 120° C., for a timer period of from 3 to 100 hours.

10. The process of claim 9 wherein said polymerizable composition has a viscosity value of within the range of from 50 to 200 centistokes at 25° C. and wherein the volume shrinkage during polymerization is lower than about 10% by volume.

11. The process according to claim 9, wherein component (A) contains at least about 80 to 90% by weight of a monomer of diethyleneglycol bis(allylcarbonate), the residual percentage constituting oligomers of diethyleneglycol bis(allylcarbonate).

12. The process according to claim 9, wherein component (B) is defined by the following formula:

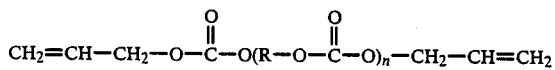

wherein R is the radical of diethylene glycol and n has an average value of about 3.

13. The process according to claim 9, wherein component (C) is a monomer product of a reaction of diallylcarbonate with tris(hydroxyethyl)isocyanurate in a molar ratio of about 12:1, said component (C) containing about 60 to 70% by weight of a monomer of tris(hydroxyethyl)isocyanurate tris(allylcarboante), the residual percentage constituting oligomers of tris(hydroxyethyl)isocyanurate tris(allylcarbonate).

14. The process according to claim 9, wherein said composition comprises from 15 to 45% by weight of component (A), from 30 to 60% by weight of component (B) and from 10 to 45% by weight of component (C).

15. The process according to claim 9, wherein said free-radical initiator is selected from a member of the group consisting of diisopropylperoxydicarbonate, dicyclohexylperoxydicarboante, disec.butylperoxydicarbonate, dibenzoylperoxide and tert-butylperbenzoate.

16. The process according to claim 9, wherein said composition contains said free-radical initiator in an amount of from 3 to 5.5% by weight relative to the total weight of components (A), (B) and (C).

17. The process according to claim 9, wherein said composition additionally comprises one or more stabilizers, release agents, dyes, pigments, U.V.-radiation absorbers and I.R.-radiation absorbers, in an overall amount not greater than 1% relative to the total weight of components (A), (B) and (C).

18. A polymerizate formed from said polymerizable liquid composition of claim 1.

19. A polymerizate formed from said polymerizable liquid composition of claim 5.

20. The composition according to claim 1, wherein said composition has a viscosity value of within the range of from 50 to 200 centistokes at 25° C.

21. The composition according to claim 5, wherein said composition has a viscosity value of within the range of from 50 to 200 centistokes at 25° C.

22. Optical glasses formed from said polymerizate of claim 18.

23. Optical glasses formed from said polymerizate of claim 19.

* * * * *